United States Patent [19]

Kleiman

[11] Patent Number: 5,739,624
[45] Date of Patent: Apr. 14, 1998

[54] MICROPOSITIONING DEVICES, USING SINGLE-CRYSTAL PIEZOELECTRIC BODIES, HAVING AT LEAST TWO SPATIAL DEGREES OF FREEDOM

[75] Inventor: Rafael Nathan Kleiman, New Brunswick, N.J.

[73] Assignee: Lucent Technologies Inc., Murray Hill, N.J.

[21] Appl. No.: 531,140

[22] Filed: Oct. 18, 1995

Related U.S. Application Data

[63] Continuation-in-part of Ser. No. 397,590, Mar. 2, 1995, abandoned.

[51] Int. Cl.$^6$ ..................................................... H01L 41/08
[52] U.S. Cl. ............................................................ 310/328
[58] Field of Search ...................................... 310/328, 366

[56] References Cited

U.S. PATENT DOCUMENTS

| | | | |
|---|---|---|---|
| 4,785,177 | 11/1988 | Besocke | 310/328 |
| 4,877,957 | 10/1989 | Okada et al. | 310/328 |
| 5,306,919 | 4/1994 | Elings et al. | 310/328 |
| 5,371,365 | 12/1994 | Watanabe et al. | 250/306 |
| 5,453,653 | 9/1995 | Zumeris | 310/323 |
| 5,640,063 | 6/1997 | Zumeris | 310/328 |

FOREIGN PATENT DOCUMENTS 3812684  11/1989  Germany ................ 310/328

OTHER PUBLICATIONS

Pending patent application Ser. No. 08/328,297 filed in the United States on Oct. 24, 1994, (Marchman 10–11).
Chapter 9 in book "Introduction to Scanning Tunneling Microscopy," by C. Julian Chen, IBM Research Division, Thomas J. Watson Research Center, Yorktown Heights, New York. Chapter 9 entitled Piezoelectric Scanner, pp. 213–235.

*Primary Examiner*—Thomas M. Dougherty
*Attorney, Agent, or Firm*—David I. Caplan; Scott J. Rittman

[57] ABSTRACT

A piezoelectric micropositioning device includes, in one embodiment, four single-crystal piezoelectric bodies cut in the form of single-crystal parallel slabs from a single larger single crystal. Each of the single-crystal slabs has a separate electrode attached to an opposing major surface. One of the end faces of each of the slabs is fixed to a substrate; the other of the end faces is fixed to a holder. In response to voltages applied to the electrodes, the holder can be moved in two or three linearly independent directions, depending upon the applied voltages. In another embodiment, only a single piezoelectric body, preferably in the shape of a column and in conjunction with at least four electrodes located on the side surfaces of the column, is required for such motion in two or three directions.

4 Claims, 4 Drawing Sheets

MICROPOSITIONING DEVICES, USING SINGLE-CRYSTAL PIEZOELECTRIC BODIES, HAVING AT LEAST TWO SPATIAL DEGREES OF FREEDOM

This application is a continuation-in-part of application Ser. No. 08/397,590, filed on Mar. 2, 1995 now abandoned.

FIELD OF THE INVENTION

This invention relates to micropositioning devices—i.e., devices capable of controllably positioning (i.e., deflecting) an end of one or more solid or hollow bodies with subnanometer accuracy—and more particularly to such devices that use piezoelectric materials for controlling such positioning in at least two linearly independent directions in space (i.e., in at least two degrees of spatial freedom).

BACKGROUND OF THE INVENTION

A typical three-dimensional micropositioning device takes the form of a hollow cylindrical tube made of a piezoelectric ceramic material, such as PZT (lead zirconate titanate). See, for example, C. Julian Chen, *Introduction to Scanning Tunneling Microscopy*, Chapter 9 (Oxford University Press, 1993). The material of the tube is electrostatically poled with a permanent electric dipole moment P by subjecting the tube to a radial dc electric field. Typically this field is produced by applying a voltage to the four, outer electrodes while grounding the inner electrode. The tube carries typically four electrodes (hereinafter called "outer electrodes") on its outer surface, as well as a single electrode (hereinafter called "inner electrode") on its entire inner surface. The tube with appropriate electrical connections can be used to move the position of the probe in three dimensions.

After having been thus poled, one end (typically the bottom end) of the tube typically is fixed in a substrate. The other end (typically the top end; hereinafter "the moveable end" or "the tip") of the tube can be controllably deflected in two dimensions (in the horizontal plane) by varying the four voltages applied to the four outer electrodes, respectively, while the voltage being applied to the inner electrode is kept constant (typically ground). On the other hand, the moveable end can be controllably deflected in the vertical direction, for example, by varying the voltage on the inner electrode while maintaining the average of the four voltages applied to the outer electrodes constant. In this way, simultaneous three-dimensional controllable micropositioning of the moveable end of the tube can be obtained.

One of the problems encountered with such a device stems from the nonuniformity of the PZT material incorporated in the micropositioning device, which gives rise to unpredictability of the deflections. The only known useful micropositioning-device form of PZT is a ceramic. Being a ceramic, the PZT is composed of grains. These grains have sizes that are not uniform throughout the tube: the grains vary unpredictably from point to point in the tube. Therefore, the deflections of the tip of the tube, in response to a fixed applied voltage, will vary from one tube to another, even if all of them were fabricated in the same way. Consequently, micropositioning devices using such PZT tubes will not exhibit a predictable deflection in response to the applied voltages.

Accordingly, it would be desirable to have a more predictable piezoelectric micropositioning device.

SUMMARY OF THE INVENTION

In accordance with the invention, one or more bodies of single-crystal piezoelectric material is (are) used to control, separately and independently simultaneously in three orthogonal spatial directions, the deflections of the tip of a micropositioning device, in response to voltages applied to electrodes located on major surfaces of the one or more bodies.

In one specific embodiment, the inventive micropositioning device includes only one single-crystal piezoelectric body. Advantageously, the crystal body is one of a plurality of crystal bodies cut from a larger single crystal. The resulting crystal body has a major crystallographic axis having a significant component parallel to a vertical direction. Moreover, the body has a pair of end faces in a horizontal plane, one of the end faces being held firmly in place. Also, in response to electric fields in at least one direction in the horizontal plane, the crystal body exhibits a significant piezoelectric deflection in the vertical direction. In addition, the body has at least four major outside surfaces intersecting the horizontal plane. At least four electrodes are located on these four outside major surfaces: for example, advantageously one electrode coats substantially the entire surface of one of the four outside major surfaces, one electrode coats substantially the entire surfaces of both of two (advantageously adjacent surfaces) of the four outside major surfaces, and two separate electrodes coats substantially the entire surface of the remaining fourth major surface. In this way, in response to voltages applied to the electrodes, the second end face can be controllably moved in at least two dimensions—i.e., can be controllably moved in at least two linearly independent spatial directions. That is to say, the body has controllable motion characterized by at least two (independent) controllable degrees of (spatial) freedom. The body together with its electrodes can then be incorporated into a scanning microscope system, for example.

In another specific embodiment of the invention, a micropositioning device comprises a plurality of single-crystal piezoelectric bodies. Each of these single crystal bodies is cut from a larger single crystal. Each of the resulting crystal bodies has a major crystallographic axis having a significant component parallel to a vertical direction. Also, in response to electric fields in at least one direction in the horizontal plane, the crystal body exhibits a significant piezoelectric deflection in the vertical direction. In addition, the body has at least two major side surfaces intersecting the horizontal plane. Each of these bodies advantageously is fastened at its bottom end to a substrate and at its top end to a holder slab, such as for holding an optical fiber of a scanning optical microscope. In this way, in response to voltages applied to the electrodes, the holder slab can be controllably moved in at least two dimensions—i.e., can be controllably moved in at least two linearly independent spatial directions. That is to say, the body has controllable motion characterized by at least two (independent) controllable degrees of (spatial) freedom. Advantageously, the holder slab has an aperture for insertion of an optical fiber, the optical fiber ultimately carrying optical radiation from an optical source to a surface of a sample body. The optical radiation reflected or transmitted by the sample body can be examined by an optical imaging system such as a microscope, in order to form an image of this reflected or transmitted radiation (the micropositioning device thus being an essential part of the entire arrangement, as known in the art).

The use of a single-crystal piezoelectric body cut from a larger one has the advantage of point-to-point uniformity, whereby the piezoelectric deflections, in response to applied electric fields, for each of the single-crystal bodies cut from the same large one will be predictable: that is, will be the same as for the others cut from the same larger one.

Only for the sake of clarity, none of the drawings is to any scale.

DETAILED DESCRIPTION

Figure 1:
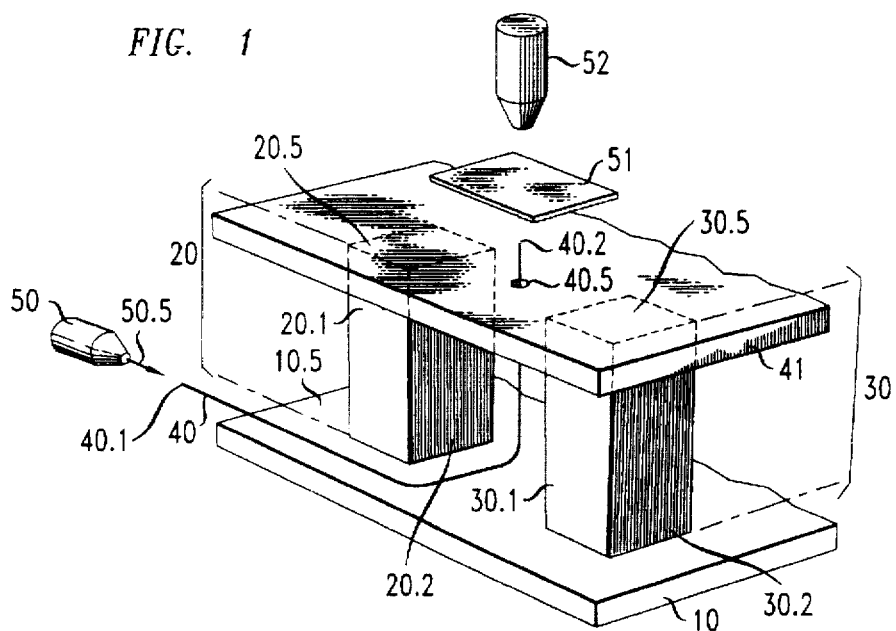
FIG. 1 is a perspective view of a portion of one type of optical scanning probe microscope, useful in explaining the principles of the invention.

Turning to FIG. 1, a fixed substrate 10 rigidly supports on its top surface 10.5 a pair (or more, not shown) of single-crystal piezoelectric columnar bodies 20 and 30. Advantageously, each of these bodies is a lithium niobate crystal that has been cut from the same larger one (not shown). Typically each of the bodies 20 and 30 takes the geometric form of a rectangular or square cylindrical column running in the vertical (z) direction. Electrodes are attached to front and side surfaces 20.1 and 20.2, respectively, of the body 20 and to front and side surface 30.1 and 30.2, respectively, of the body 30—or to the front and back surfaces of these bodies—as further described below.

A rigid holder slab 41 is fixed to top faces 20.5 and 30.5, of the bodies 20 and 30, respectively. This holder slab 41 has an aperture 40.5 to which an optical fiber is firmly attached and through which the optical fiber 40 penetrates in a gentle but firm manner: see, for example, the structures disclosed in pending application Ser. No. 08/328,297, filed in the United States on Oct. 24, 1994, which is incorporated herein by reference. Advantageously the fiber 40 has a vertical axis that coincides with the centroid of the columnar bodies 20 and 30. Thus the slab determines the position of the tip of the fiber 40. One end 40.1 of the fiber receives an optical radiation beam 50.5 from an optical source 50, typically a laser. Another end 40.2 of the fiber 40 directs the resulting optical radiation propagating through the fiber to a surface of a sample body 51 located in close proximity to the end 40.2 of the fiber 40. Typically the sample body 51 is transparent to the optical beam emanating from the end 40.2 of the fiber 40. A microscope system 52 is typically located on the side of the sample 51 distal from the end 40.2 of the fiber 40. As known in the art, the microscope system 52 includes an optical imaging system (typically focusing lenses) and an optical image sensing system.

In order to understand the operation of a single-crystal piezoelectric body, an xyz orthogonal coordinate system is drawn in FIG. 1. In particular, the z-axis is oriented vertically, that is, parallel to the normal to the top surface 10.5 of the substrate 10. The resulting xy plane is thus parallel to the plane of the horizontal.

Figure 2:
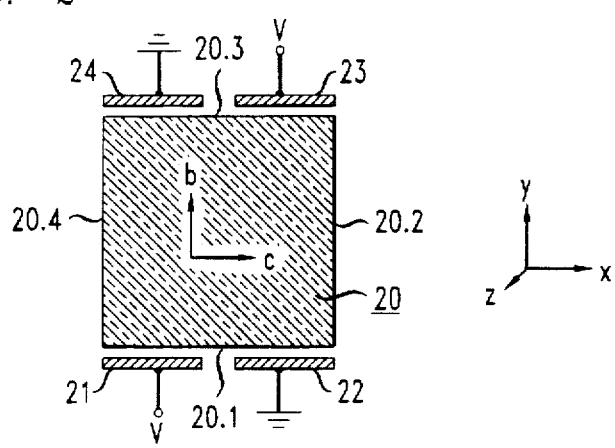
FIGS. 2-4 depict cross sectional views of a body of single-crystal piezoelectric material, useful in explaining the principles of the invention.

Turning to FIG. 2, the arrangement here (a depiction of an xy cross section of the body 20 typically having the geometric form of a cylindrical column) shows how to move (tilt) the top face 20.5 (FIG. 1) of the body 20 solely in the x direction, and hence how to deflect the rigid holder slab 41 likewise solely in the x direction. To this end, the single-crystal piezoelectric body 20 has its top xy face firmly attached to the bottom surface of the rigid holder slab 40 and its bottom xy face firmly attached to the top surface of the substrate 10. Also, the fiber 40 can be introduced through a hole (not shown) running through the body 20 in the z direction, whereby the need for the holder slab 41 is avoided.

The crystallographic a-axis (not shown) of the body 20 is oriented parallel to the z direction; the crystallographic b-axis, parallel to the +y direction; and the crystallographic c-axis, parallel to the +x direction. This orientation is selected so that an electric field in the b (=+y) direction produces a significant expansion, preferably a maximum expansion, of the body 20 in the z direction, and such that an electric field in the −b (=−y) direction produces a significant contraction, preferably a maximum contraction, of the body 20 in the z direction. On the other hand, an electric field in the x direction (i.e., in either the +x or the −x direction) does not produce any significant expansion or contraction in the z direction. This orientation of the body 20 is also used in FIGS. 3, 4, 5, and 6.

Two electrodes 21 and 22 (FIG. 2) are attached in a known manner to the front surface 20.1 of the body 20, and two other electrodes 23 and 24 are attached in a known manner to a back surface 20.3 opposite the front surface 20.1 of the body 20. A positive voltage V is applied to the electrodes 21 and 23. The electrodes 22 and 24 are grounded (V=0).

As a result of these applied voltages (V and ground), an electric field is established in the body 20 in the +y direction (+b direction) in the left-hand half of the xy cross section of the body 20 shown in FIG. 2, and an electric field in the −y direction (−b direction) is established in the right-hand half of the xy cross section. Thus, the left-hand half of the body 20 expands in the z direction, and the right-hand half of the body 20 contracts in the z direction. Consequently, the overall (average) length of the body 20 in the z direction remains the same, and hence the holder slab 41 is not moved in the z direction at all. However, the top face 20.5 (FIG. 1) of the body 20 is deflected (tilted) solely in the +x direction. At the same time, there is no deflection (tilting) in the y direction because of the symmetry of the arrangement and the properties of the b- and c-crystallographic axes. Consequently, the bottom surface of the rigid holder slab 41 is deflected solely in the +x direction.

Figure 3:
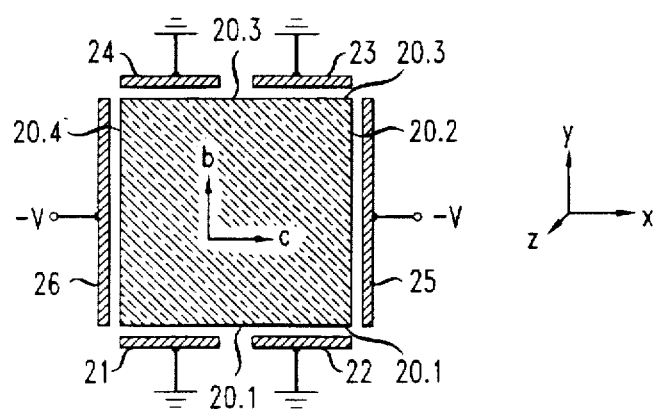

Turning to FIG. 3, the arrangement here shows how to deflect (tilt) the top face 20.5 (FIG. 1) of the body 20 solely in the y direction, and hence to deflect the bottom surface of the rigid holder slab 41 solely in the y direction. Again, as described above in connection with FIG. 2, the single-crystal piezoelectric body 20 has its top surface firmly attached to the bottom surface of the rigid holder slab 40 and its bottom xy face firmly attached to the top surface of the substrate 10. Also, the fiber 40 can be introduced through a hole (not shown) running through the body 20 in the z direction. Four electrodes 21, 22, 23, and 24 are attached to the body 20 in the same way as in FIG. 2. However, two more electrodes 25 and 26 are attached to the side surfaces 20.2 and 20.4, respectively, of the body 20. The four electrodes 21, 22, 23, and 24 are grounded. A (negative) voltage −V is applied equally to the two electrodes 25 and 26. The back half of the body 20—i.e., the half proximate to the back surface 20.3— will have an average electric field in the +y (=−b) direction. Since only the y components of the electric fields produce any expansion or contraction of the body 20 in the z direction, consequently the back half will undergo a contraction. But the front half—i.e., the half proximate the front surface 20.1— will have an average electric field in the −y (=+b) direction and therefore will undergo an expansion in the z direction. Consequently, by virtue of the electric fields produced in the body 20 by the applied voltages V, while the overall (average) length of the body 20 in the z direction remains the same, the top face 20.5 (FIG. 1) of the body 20 is tilted in the +y direction. At the same time, there is no deflection (tilting) in the x direction because of the symmetry of the arrangement. Hence the bottom surface of the holder slab 41 is not moved in the z direction at all, but it is deflected solely in the +y direction.

Figure 4:
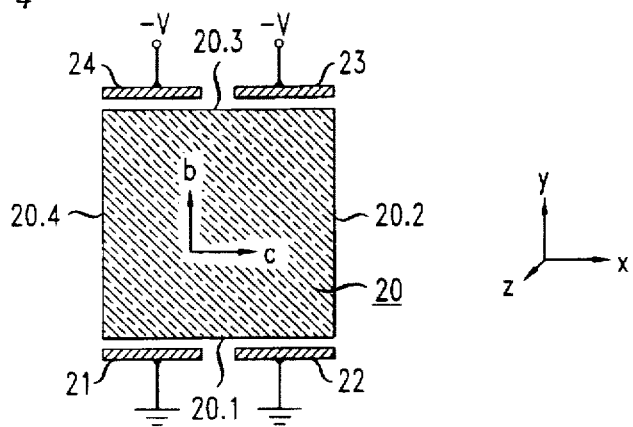

Turning to FIG. 4, the arrangement here shows how to move the top face 20.5 (FIG. 1) of the body 20, and hence the bottom surface of the holder slab 41, solely in the z direction. Again, as in FIGS. 2 and 3, the single-crystal piezoelectric body 20 has its top xy face 20.5 firmly attached to the bottom surface of the rigid holder slab 40 (FIG. 1) and its bottom xy face firmly attached to the top surface of the substrate 10. Also, the fiber 40 can be introduced through a hole (not shown) running through the body 20 in the z direction, whereby the need for the holder slab 41 is avoided. The four electrodes 21, 22, 23, and 24 are attached in the same manner as previously shown in FIG. 2. However, here in FIG. 4, voltages −V are applied to the two electrodes 23 and 24 attached to the back surface 20.3 of the body 20, while the two electrodes 21 and 22 attached to the front surface 20.1 of the body 20 are grounded. As a result of the electric field in the −y (=+b) direction, produced by the voltages V, practically everywhere in the body 20, both the left-hand and the right-hand halves of the depicted xy cross section expand in the z direction. Consequently, the top face 20.5 (FIG. 1) of the body 20, and hence the bottom surface of the holder slab 41, is moved upward in the z direction. At the same time, by reason of symmetry, there is no deflection (tilting) in either the x or the y direction.

In the resulting x, y, and z deflections of the top face 20.5 of the body 20 (FIGS. 2, 3, and 4, respectively), the increments of the resulting x, y, and z deflections, of course, monotonically increase with increasing magnitudes of V (unless saturation of the piezoelectric effect is reached at high enough fields). Indeed, within reasonable values of V, the increments of the x, y, and z deflections ordinarily vary linearly with increments of V.

The above descriptions of FIGS. 2–4 thus show how to obtain separate and independent simultaneous x and y deflections (tiltings) as well as z deflections of the top face 20.5 of the body 20, and hence of the holder slab 41—as controlled by the value of the Voltage V. These deflections will be communicated by the holder slab 41 to the tip 40.2 of the fiber 40. Scanned microscopy of the sample body 51 is obtained by allowing the optical beam exiting from the tip 40.2 of the fiber 40 to strike the sample body 51. The images of the optical radiation emanating from (i.e., scattered by) the sample 51 in response to the optical beam will be focused and detected by the microscope system 52, as known in the art.

Figure 5:
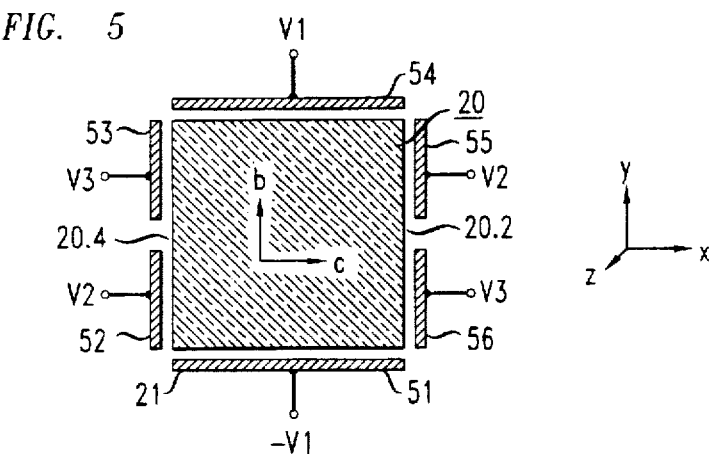
FIG. 5 is a cross-sectional view of a body of single-crystal piezoelectric material, in accordance with a specific embodiment of the invention.

FIG. 5 shows an arrangement for obtaining simultaneous but controllable and independent x, y, and z deflections of the top face 20.5 of the body 20 (FIG. 1) and hence of the tip 40.2 of the optical fiber 40, using one and the same single-crystal piezoelectric body 20, as was the case in FIG. 5. Again, as in the arrangements shown in FIGS. 2, 3, and 4, in the arrangement shown in FIG. 5, the single-crystal piezoelectric body 20 has its top xy face 20.5 firmly attached to the bottom surface of the rigid holder slab 40 (FIG. 1) and its bottom xy face firmly attached to the top surface of the substrate 10. Also, the fiber 40 can be introduced through a hole (not shown) running through the body 20 in the z direction, whereby the need for the holder slab 41 is avoided.

Six electrodes 51, 52, 53, 54, 55, and 56 (FIG. 5) are attached to major columnar surfaces of the body 20. More specifically, the electrodes 51 and 54 are attached to substantially the entire front and back surfaces 20.1 and 20.3 of the body 20, respectively; each of the electrodes 52 and 53 is attached to substantially one-half of the side surface 20.4 of the body 20; and each of the electrodes 55 and 56 is attached to substantially one-half the side surface 20.2 of the body 20, respectively. Voltages V1 and −V1 are applied to the electrodes 51 and 54, respectively; voltage V2 is applied to the electrodes 52 and 55; and voltage V3 is applied to the electrodes 53 and 56.

From the principles underlying the above discussions of the arrangements shown in FIGS. 2–4, the following can be shown with respect to the deflections of the top face 20.5 of the body 20 in the arrangement shown in FIG. 5: (1) setting V1=V3=0, the deflections in the direction making an angle of $\pi/4$ (45°) with respect to the x axis are proportional to V2; (2) setting V1=V2=0, the deflections in the direction making an angle of $3\pi/4$ (135°) are proportional to V3; and (3) setting V2=V3=0, the deflections in the z direction are proportional to V1. Consequently, in order to achieve a deflection purely in, say, the y direction, then a superposition of deflections in the $\pi/4$ and the $3\pi/4$ directions will accomplish this task: that is, set V1=0, and set V2=V3≠0. Thus the arrangement shown in FIG. 5 can produce separate and linearly independent simultaneous deflections of the top (xy) face 20.5 of the body 20, and hence of the bottom surface of the holder slab 41 as well as the tip 40.2 of the optical fiber 40.

Figure 6:
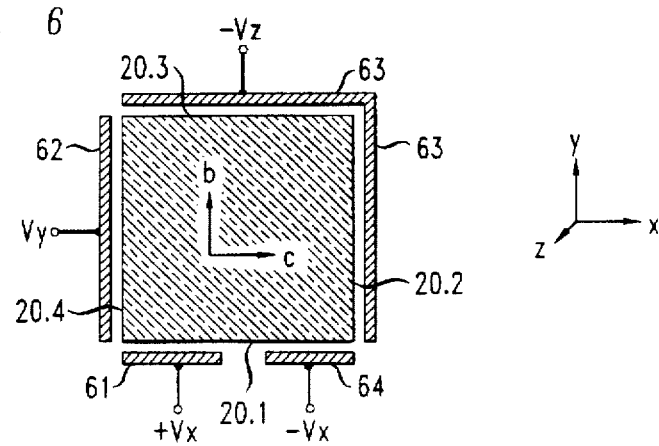
FIG. 6 is a cross-sectional view of a body of single-crystal piezoelectric material, in accordance with a specific embodiment of the invention.

The arrangement shown in FIG. 6 similarly shows how to obtain simultaneous but controllable and independent x, y, and z deflections of the top face 20.5 of the body 20 (FIG. 1) and hence of the tip 40.2 of the optical fiber 40 using one and the same single-crystal piezoelectric body 20, as was the case in FIG. 5—except that here in the arrangement shown FIG. 6, it is simpler (i.e., with fewer electrodes; but perhaps at the sacrifice of smaller deflections per volt) to obtain deflections separately and purely in the x or y direction, i.e., without resorting to superposition. Again, as was the case in the arrangement shown in FIG. 5, in the arrangement depicted in FIG. 6 the single-crystal piezoelectric body 20 has its bottom xy face firmly attached to the top face of the substrate 10 and its top xy face 20.5 firmly attached to the bottom surface of the rigid holder slab 41. Also, the fiber 40 can be inserted through a hole (not shown) running through the body 20 in the z direction, whereby the need for the holder slab 41 is avoided.

Four electrodes 61, 62, 63, and 64 are attached to the major columnar surfaces of the body 20 (FIG. 6). More specifically, each of the electrodes 61 and 64 is attached to substantially one-half of the front surface 20.1 of the body 20; the electrode 62 is attached to substantially the entire side surface 20.4 of the body 20; and the electrode 63 is attached to substantially the entire side and back surfaces 20.2 and 20.3, respectively, of the body 20. Voltages Vx and −Vx are applied to the electrodes 61 and 64, respectively; voltage Vy is applied to the electrode 62; and voltage −Vz is applied to the electrode 63.

From the above discussion of the arrangements shown in FIGS. 2–4, the following can be shown with respect to the arrangement shown in FIG. 6: (1) setting Vy=Vz=0, the deflections in the x direction are proportional to Vx; (2) setting Vx=Vz=0, the deflections in the y direction are proportional to Vy; and (3) setting Vx=Vy=0, the deflections in the z direction are proportional to Vz. Thus the arrangement shown in FIG. 6 can produce separate and independent simultaneous x, y, and z deflections of the top (xy) face 20.5 of the body 20, and hence of the bottom surface of the holder slab 41 as well as of the tip 40.2 of the optical fiber 40.

Figure 7:
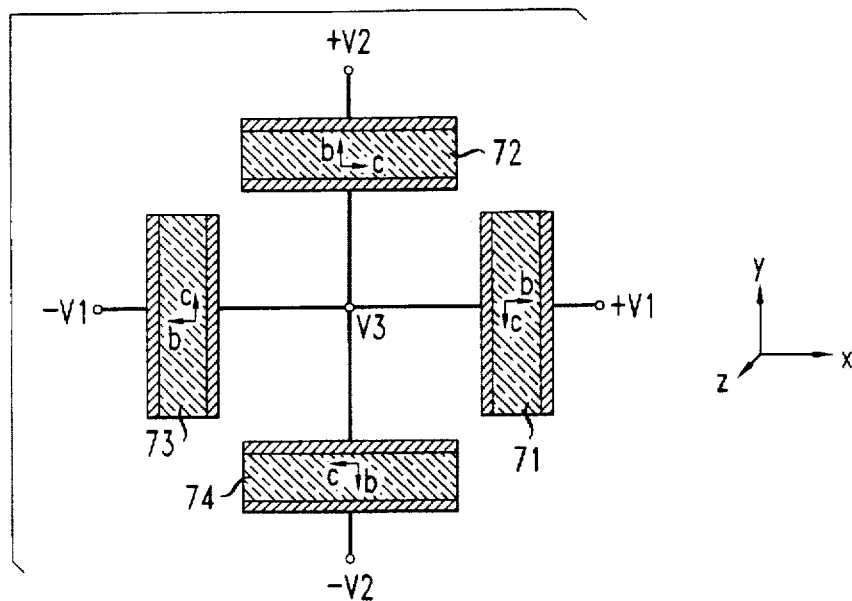
FIG. 7 is a cross-sectional view of an arrangement of illustratively four bodies of single-crystal piezoelectric material, arranged in accordance with another specific embodiment of the invention.

Turning to FIG. 7, the arrangement shown here enables deflections in the x, y, and z directions using only three voltages V1, V2, and V3. As indicated (FIG. 7) each of four single-crystal piezoelectric parallel slabs 71, 72, 73, and 74, typically of lithium niobate, has a pair of major parallel columnar surfaces. Each of the slabs 71, 72, 73, and 74 advantageously has been cut from the same larger crystal (not shown) in such a manner that each of them has its crystallographic b-axis aligned parallel to the normal to its major parallel surfaces. The crystallographic a-axis of each of the slabs 71, 72, 73, and 74 is aligned parallel to the z direction; the crystallographic c axis of each of the slabs is aligned in the xy plane perpendicular to the b-axis. The top xy face of each of these piezoelectric slabs 71, 72, 73, and 74 is attached to the bottom surface of the rigid holder slab 41 (FIG. 1); the bottom xy surface of each of these slabs is attached to the top surface of the substrate 10. In addition, each of the major surfaces of each of the piezoelectric slabs is coated with an electrode.

As further shown in FIG. 7, the crystallographic b axes of the piezoelectric slabs 71 and 73 are aligned parallel to the +x and −x axis, respectively; the b axes of the piezoelectric slabs 72 and 74 are aligned parallel to the +y and −y axis, respectively. Each of the slabs 71, 72, 73, and 74 is incorporated into the arrangement shown in FIG. 1 (with slab 71=body 20; slab 72=body 30, etc.). A voltage V1 is applied to the right-hand (+x) electrode of the piezoelectric slab 71; a voltage −V1 is applied to the left-hand (−x) electrode of the piezoelectric slab 73; a voltage V3 is applied both to the left-hand (−x) electrode of the piezoelectric slab 71 and to the right-hand (+x) electrode of the piezoelectric slabs 71 and 73. A voltage +V2 is applied to the rear (+y) electrode of the piezoelectric slab 72, and a voltage −V2 is applied to the front (−y) electrode of the piezoelectric slab 74. The voltage V3 is applied both to the front (−y) electrode of the piezoelectric slab 72 and to the rear (+y) electrode of the piezoelectric slab 74.

From the above discussion in conjunction with FIGS. 2–4, it follows that a positive value of the voltage V1 produces a contraction of the piezoelectric slab 71 in the vertical (z) direction and an expansion of the piezoelectric slab 73 in the vertical (z) direction. Thus, when the piezoelectric slabs 71, 72, 73, and 74 are incorporated into the arrangement shown in FIG. 1, a positive value of the voltage V1 (holding V2=V3=constant) will deflect (tilt) bottom surface of the holder slab 41, and hence will deflect the tip 40.2 of the optical fiber 40, in the +x direction. By similar reasoning, a positive value of V2 (holding V1=V3=constant) will deflect (tilt) the tip of the fiber 40 in the +y direction. No deflections in the z direction can result in any event during these x or y deflections, because the average deflection of the top surfaces of bodies 71, 72, 73, and 74 is zero during any of these x or y deflections.

If there is no need to avoid dependent deflections in the z direction during the foregoing x or y deflections, then the piezoelectric slabs 73 and 74 can be replaced with non-piezoelectric rigid slabs (without any electrodes attached to them, or they can be omitted).

In order to obtain deflections in the z direction, incremental voltages +V3 are applied to the left-hand electrode of the slab 71, to the front electrode of the slab 72, to the right hand electrode of the slab 73, and to the rear electrode of the slab 74 (holding V1=V2=constant). Thus a positive voltage V3 will cause the bottom surface of the holder 41 (FIG. 1) to move upward, and hence till cause the tip 40.2 of the fiber 40 likewise to move upward (i.e., in the +z direction). Reversal of the polarity of V3 will cause the slabs 71, 72, 73, and 74 to contract in the z direction—and thus will cause the bottom surface of the holder slab 41 and hence the tip 40.2 of the fiber 40 to move downward in (i.e., purely in the −z direction).

Figure 8:
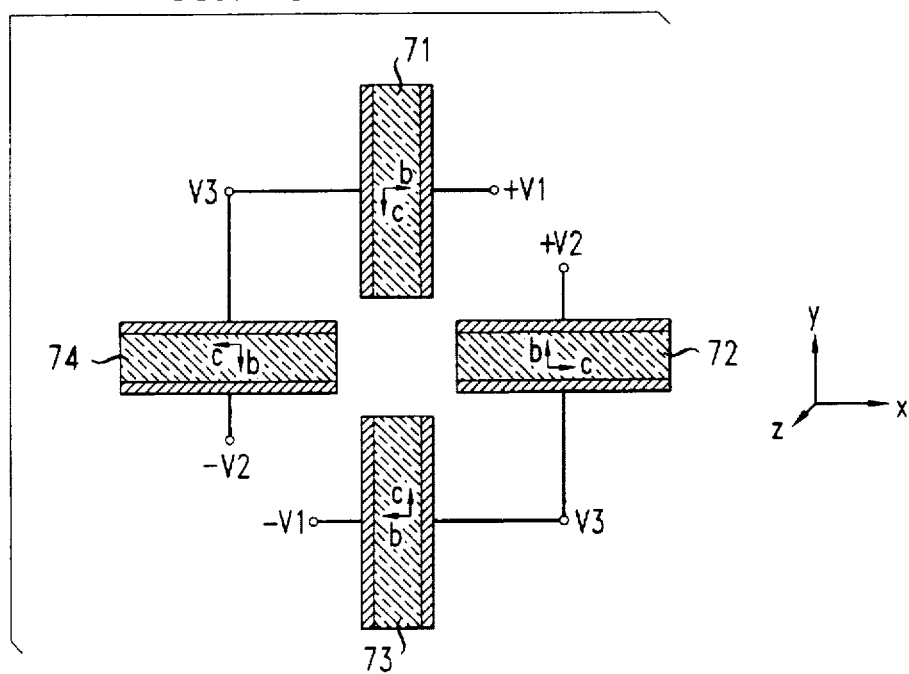
FIG. 8 is a cross-sectional view of a an arrangement of illustratively four bodies of single-crystal piezoelectric material, arranged in accordance with yet another specific embodiment of the invention.

FIG. 8 shows an alternative arrangement to that shown in FIG. 7. Here in FIG. 8 the single-crystal piezoelectric slabs 71, 72, 73, and 74 are rotated and translated in the xy plane with respect to their positions shown in FIG. 7.

Figure 9:
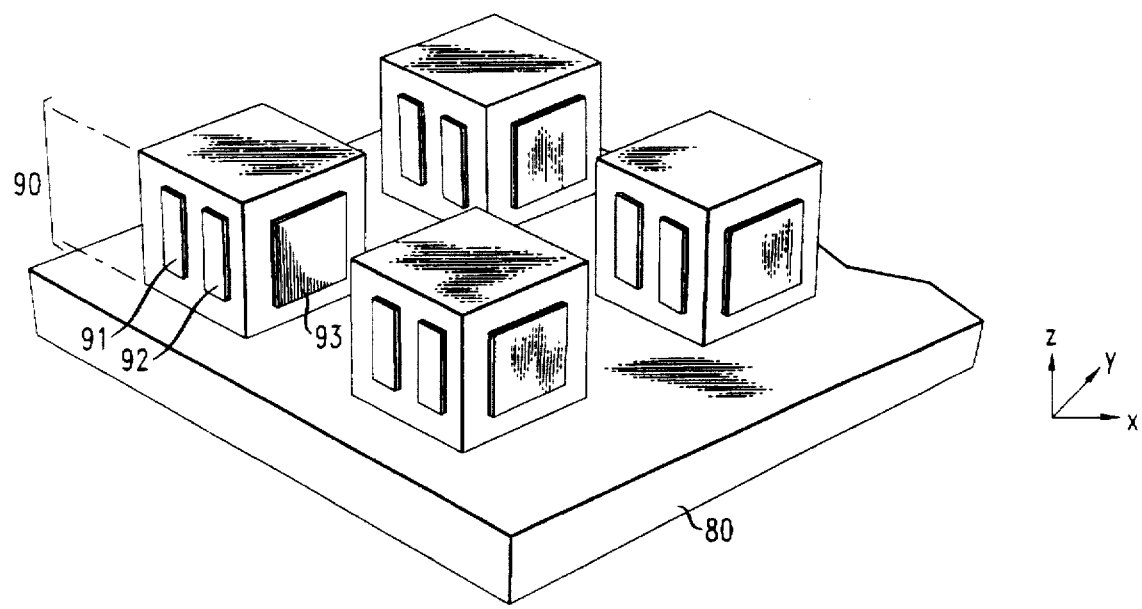
FIG. 9 is a perspective view of an arrangement of illustratively four bodies of single-crystal piezoelectric material, arranged in accordance with yet another specific embodiment of the invention.

FIG. 9 shows another alternative arrangement to that shown in FIG. 5 or FIG. 6. Here in FIG. 8, each of a multiplicity of single crystal piezoelectric columns 90 is batch fabricated from a single-crystal substrate 80. Electrodes 91 and 92 are attached to the front surface, and an electrode 93 to the side surface, of each of the columns 90. Other electrodes (not shown) are attached to the rear and to the other side surface (not shown) of these columns 90, much as in the same way as previously discussed in conjunction with the description of FIG. 6 (electrode 91 in FIG. 9 is equivalent to electrode 61 in FIG. 6; electrode 92 is equivalent to electrode 62; and electrode 93 is equivalent to electrode 63). In similar manner as described above in conjunction with FIG. 6, voltages are applied to these electrodes 91, 92, 93, etc., in order to obtain horizontal (xy) deflections and vertical (z) deflections. If desired, after dicing the substrate 80, many piezoelectric scanning devices can be fabricated from the single substrate 80. On the other hand, without dicing, the array of piezoelectric scanning devices can be used while still attached to the substrate 80.

The arrangement shown in FIG. 9 can be fabricated in the following manner, for example. A top surface of a single-crystal substrate is masked with a stencil mask and is wet or dry etched, anisotropically. Then the resulting side surfaces of the resulting columns can be provided with electrodes by means of masking these side surfaces and painting them with a metallic paint.

The electrodes shown in FIGS. 2–9 advantageously run along substantially the entire vertical distance from the bottom to the top face of the body 20.

Although the invention has been described in detail with respect to specific embodiments, various modifications can be made without departing from the scope of the invention. For example, instead of an optical fiber, other forms of optical waveguides can be used: e.g., the single-crystal piezoelectric columnar body itself can support optical propagation in conjunction with an optically opaque coating on each of its end faces and with a separate transparent aperture located on each of these end faces for the entrance and exit of the optical radiation, respectively.

Figure 10:
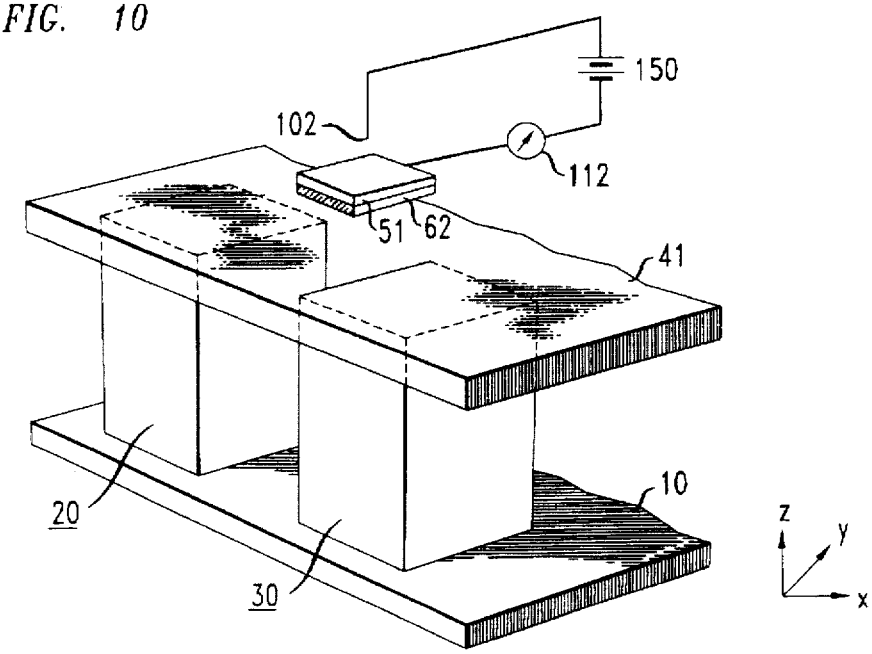
FIG. 10 is a perspective view, partly in cross-section, of a portion of another type of scanning probe device, in accordance with another specific embodiment of the invention.

Further, instead of an optical waveguide, a wire or wires can be used, the wire or wires being attached to a probe device such as a tunneling tip, a force probe, a capacitive probe, a magnetic probe, or a thermal probe. In the case of a tunneling tip, instead of a laser source, a terminal of a voltage source is used and is electrically connected to the probe device via a wire, and the backside of the sample is coated with an electrically insulating layer in order to decouple the sample from the holder as well as from the piezoelectric body or bodies; the sample itself is electrically connected to the other terminal of the voltage source; and the resulting current is detected by a current sensor. Further, instead of having the holder 41 move the optical fiber tip 40.2 (or the tips of the wires in cases of tunneling tips), the sample 51 is fixed to the holder 41 and the holder 41 can be arranged to move the sample 51: that is, the sample 51 is rigidly attached to the holder 41. FIG. 10 illustrates such an arrangement for the case of a wire tip 102, a voltage source 150, and a current sensor 112 electrically connected to the sample 51. The wire tip 102 is held in a fixed position in space, as known in the art, while the sample 51 is moved by the motion of the holder 41, in turn, as moved by the top surface(s) of the piezoelectric columnar bodies 20 and 30. The sample 51 typically is a metal or a semiconductor slab.

In the case of the optical fiber probe, the probing field incident upon the sample is the optical radiation emitted by the tip 40.2 of the optical fiber and incident upon the sample 51. In the case of the other abovementioned probes, the probing field incident upon the sample 51 can be an electrical or a magnetic field, as known in the art. In all cases, the response of the sample to the probing field is detected by a sensor appropriate for the probing field, such as the microscope system 52 (FIG. 1) or the current sensor 112 (FIG. 1c).

Finally, other orientations of the crystal axes are feasible so long as they produce significant piezoelectric effects(s) in the desired direction(s) of movement of the probe holder and hence of the probe device. Other cross sections, geometrical arrangements, and numbers of single-crystal columnar bodies or slabs can be used, together with other electrode configurations, as should be apparent to the worker in the art. Also, instead of lithium niobate, other crystalline materials can be used such as $\alpha$-quartz, AgI, CdS, CdSe, ZnO, $\alpha$-HgS, Se, Te, $AlPO_4$, $LiTaO_3$, $LiIO_3$, $BaTiO_3$, $PbTiO_3$, $KBrO_3$, $SrTeO_3$, $KNbO_3$, $LaTi_2O_7$, $Bi_2WO_6$, $PbNb_2O_6$, $Cu_3B_7O_{13}Cl$, $Ba_2NaNb_5O_{13}Cl$, $Ba_2NaNb_5O_{15}$, $Ni_3B_7O_{13}I$, $K_3Cu(CN)_4$, $Ba_2NaNb_5O_{15}$, and $Pb_2ScNbO_6$.

I claim:

1. A micropositioning device comprising a first, a second, a third, and a fourth single crystal piezoelectric body, each body having a first surface and a second surface opposed to the first surface and each body having a first end face and a second end face opposed to the first end face; and a holder slab attached to the second end face of each body, wherein at least a first and a second electrode are attached, respectively, to the first and second surfaces of each body, and wherein the first and second electrodes of the second body and the first and second electrodes of the fourth body are oriented essentially perpendicular to the first and second electrodes of the first and third bodies, such that the holder slab is capable of movement in three independent directions in response to voltages applied to the first and second electrodes of the bodies.

2. The device of claim 1, wherein the bodies consist essentially of lithium niobate.

3. The device of claim 1, further comprising a probe device fixed to the holder slab.

4. The device of claim 1, further comprising a sample body fixed to the holder slab.

* * * * *